Patented Nov. 28, 1939

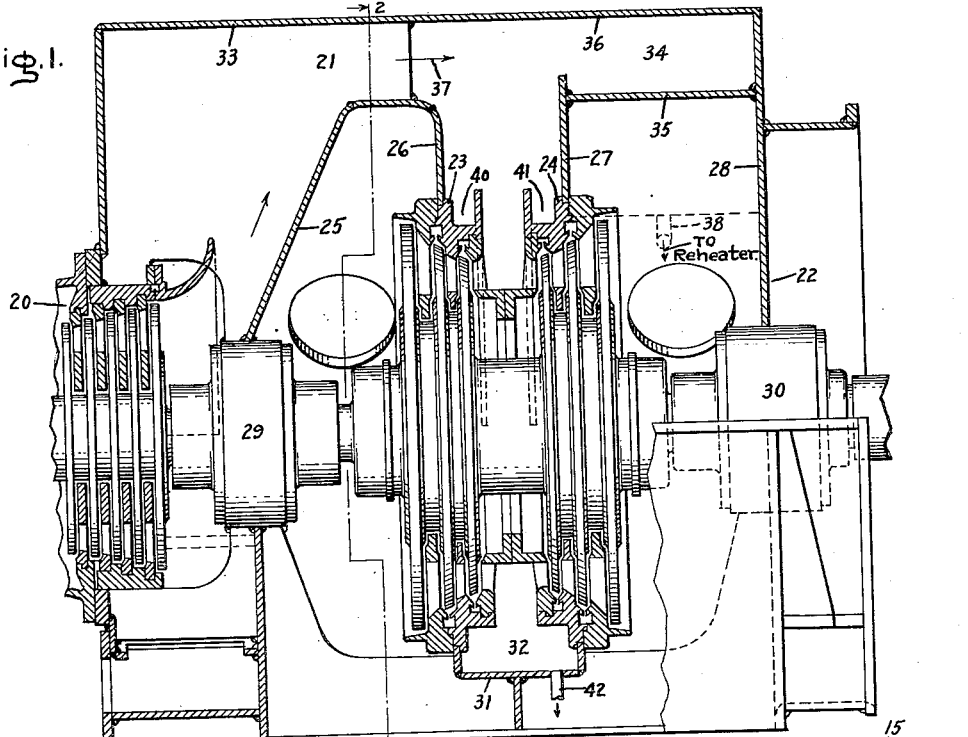
Fig. 1.
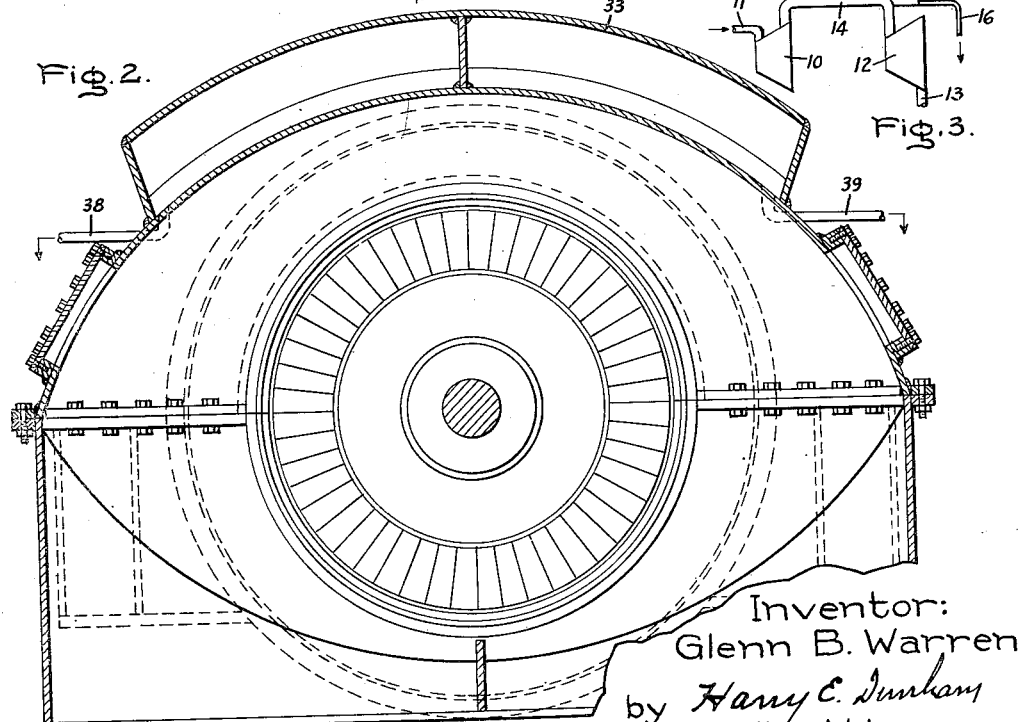
Fig. 2.
Fig. 3.
Inventor:
Glenn B. Warren,
by Harry C. Dunham
His Attorney.

2,181,751

UNITED STATES PATENT OFFICE 2,181,751

ELASTIC FLUID TURBINE ARRANGEMENT

Glenn B. Warren, Schenectady, N. Y., assignor to General Electric Company, a corporation of New York Application February 26, 1938, Serial No. 192,826

3 Claims. (Cl. 253—76)

The present invention relates to elastic fluid turbine arrangements comprising high pressure and low pressure turbines connected by a crossover conduit or conduits for conducting elastic fluid discharged from one turbine to the inlet of the other. Elastic fluid after it has passed through a turbine or turbine part and performed work therein usually contains a certain amount of liquid particles. Before passing such fluid to a low pressure turbine it is desirable to separate such particles from the remaining elastic fluid. This may be accomplished by mechanical liquid vapor separating devices or the fluid exhausted from the high pressure turbine may be reheated and liquid particles contained therein thereby converted into vapor.

The object of my invention is to provide a simple and effective arrangement for mechanically removing liquid particles from elastic fluid discharged from a high pressure turbine and to be conducted to a low pressure turbine or like elastic fluid consumer.

For a consideration of what I believe to be novel and my invention, attention is directed to the following description and the claims appended thereto in connection with the accompanying drawing.

In the drawing, Fig. 1 illustrates a sectional view of an elastic fluid turbine arrangement in accordance with my invention; Fig. 2 is a sectional view along lines 2—2 of Fig. 1; and Fig. 3 is a diagrammatic view of another embodiment of my invention.

The arrangement shown in Fig. 3 comprises a high pressure turbine 10 with an inlet 11 and a low pressure turbine 12 with an exhaust conduit 13. The two turbines are connected by a crossover conduit 14 for conducting elastic fluid discharged from the turbine 10 to the inlet of the turbine 12. In order to separate liquid particles contained in the elastic fluid conducted through the cross-over conduit 14, I provide in accordance with my invention an intermediate portion of the cross-over conduit 14 with an extension 15 for receiving and retaining liquid particles contained in the fluid. The extension 15 is connected to the cross-over conduit 14 in such manner that it forms a continuation of such portion in the direction of flow of fluid therein. Liquid particles contained in the fluid, due to their high inertia, are forced into the extension 15, whence they may be drained through a pipe 16.

The arrangement of Figs. 1 and 2 which shows the application of my invention to an actual turbine design comprises a high pressure turbine 20 which has a last stage connected by a cross-over conduit 21 to a double flow turbine 22. The latter has two turbine casings 23 and 24 and a fabricated exhaust casing including walls 25, 26, 27 and 28. The two turbines have a single shaft supported on bearings 29 and 30 which in turn are held on the walls 25 and 28. The wall 25 also forms a partition between the exhaust space of the high pressure turbine 20 and the exhaust space of the low pressure double flow turbine 22. The walls 26 and 27 also define together with a wall 31 an annular channel 32 through which elastic fluid is admitted to the double flow turbine. The upper end of this channel 32 opens into and in fact forms part of the cross-over conduit 21. The latter in addition to the walls 25, 26, 27 includes an outer wall 33 uniformly spaced from another portion of the double flow turbine exhaust casing. Further constructional details of this particular turbine design may be found in the patent to Oscar Junggren No. 2,102,416, issued December 14, 1937, and assigned to the same assignee as the present invention.

The cross-over conduit 21 has an extension 34 which is formed by a portion 35 of the exhaust casing of the double flow turbine and an outer wall 36 which is a continuation of the aforementioned wall 33. The fluid in the cross-over conduit before it approaches the extension 34 has a direction indicated by an arrow 37 and the extension 34, as will be noted, is formed in the direction of said arrow 37 so that liquid particles entrained in the fluid due to their greater inertia will enter the extension 34. The wall 27 is radially extended outward into the channel 34 to prevent liquid particles from flowing into the inlet channel 32. The liquid thus collected in the extension 34 is drained therefrom through pipes 38 and 39. These pipes are preferably connected to a consumer, such as a preheater, (not shown), in which the heat energy contained in the liquid may be utilized.

The inner portions of the side walls 26 and 27 are connected to intermediate portions of the turbine casings 23 and 24 respectively. The adjacent portions of said casings 23 and 24 have outer surfaces with circumferentially extending grooves 40 and 41 respectively for collecting water particles and conducting them to the lower portion of the inlet channel 32, whence these particles may be discharged through a pipe 42.

What I claim as new and desire to obtain by Letters Patent of the United States is:

1. Elastic fluid turbine arrangement comprising a high pressure turbine, a lower pressure double flow turbine having an exhaust casing, a cross-over conduit located above the turbines and having walls partly formed by the exhaust casing for conducting exhaust fluid from the high pressure turbine to the inlet of the double flow turbine, and an extension connected to a portion of the cross-over conduit and located beyond the inlet of the double flow turbine in the direction of flow and formed partially by the exhaust casing for receiving and retaining liquid particles entrained in the elastic fluid, said extension having a lip near its entrance to prevent back flow of liquid particles.

2. Elastic fluid turbine arrangement comprising a high pressure turbine, a low pressure double flow turbine having two turbine casings with inlets facing each other and an exhaust casing surrounding said turbine casings and forming an inlet channel for the double flow turbine, said channel including portions of the exhaust casing and of said turbine casings, said turbine casing portions having circumferentially extending grooves for receiving liquid entrained in the elastic fluid and for conducting such liquid to a lower portion of the inlet channel, and a cross-over conduit with an extension beyond the connection with the inlets in the direction of flow forming a liquid vapor separating device for conducting elastic fluid exhausted from the high pressure turbine to the inlet of the double flow low pressure turbine and for separating liquid particles contained in said fluid.

3. A double flow turbine having two halves with inlet sides facing each other and means including a casing for each half forming an annular channel for conducting elastic fluid to the halves, and means including portions of the casings located in the channel and forming circumferentially extending grooves on the outer surface of the casings for receiving liquid entrained in the elastic fluid and for conducting such liquid to a lower portion of the annular channel.

GLENN B. WARREN.